(12) United States Patent
Zhang

(10) Patent No.: US 8,193,534 B2
(45) Date of Patent: Jun. 5, 2012

(54) ARRAY SUBSTRATE OF THIN FILM TRANSISTOR LIQUID CRYSTAL DISPLAY AND METHOD OF MANUFACTURING THE SAME

(75) Inventor: Mi Zhang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 545 days.

(21) Appl. No.: 12/418,234

(22) Filed: Apr. 3, 2009

(65) Prior Publication Data

US 2009/0261342 A1   Oct. 22, 2009

(30) Foreign Application Priority Data

Apr. 17, 2008   (CN) .......................... 2008 1 0104358

(51) Int. Cl.
*H01L 21/00* (2006.01)
(52) U.S. Cl. ............... 257/72; 257/59; 257/57
(58) Field of Classification Search ............ 257/72, 257/59, 57
See application file for complete search history.

(56) References Cited

U.S. PATENT DOCUMENTS

| | | | | |
|---|---|---|---|---|
| 6,043,511 A * | 3/2000 | Kim | ............... | 257/59 |
| 7,583,336 B2 * | 9/2009 | Ahn | ............... | 349/114 |
| 7,635,616 B2 * | 12/2009 | Deng et al. | ............... | 438/149 |
| 7,760,309 B2 * | 7/2010 | Ahn et al. | ............... | 349/141 |
| 7,817,230 B2 * | 10/2010 | Ahn | ............... | 349/114 |
| 2005/0270451 A1 * | 12/2005 | Ahn | ............... | 349/114 |
| 2005/0270454 A1 * | 12/2005 | Ahn et al. | ............... | 349/114 |
| 2007/0272926 A1 * | 11/2007 | Deng et al. | ............... | 257/59 |
| 2007/0298554 A1 * | 12/2007 | Long et al. | ............... | 438/160 |
| 2008/0044761 A1 * | 2/2008 | Son et al. | ............... | 430/270.1 |
| 2008/0100766 A1 | 5/2008 | Ming et al. | | |
| 2008/0111934 A1 * | 5/2008 | Wu et al. | ............... | 349/38 |
| 2008/0158457 A1 * | 7/2008 | Park et al. | ............... | 349/39 |
| 2009/0206346 A1 * | 8/2009 | Long et al. | ............... | 257/72 |
| 2009/0261342 A1 * | 10/2009 | Zhang | ............... | 257/72 |
| 2009/0291517 A1 * | 11/2009 | Ahn | ............... | 438/30 |
| 2010/0032680 A1 * | 2/2010 | Kaitoh et al. | ............... | 257/72 |
| 2010/0156849 A1 * | 6/2010 | Lee | ............... | 345/175 |
| 2010/0157187 A1 * | 6/2010 | Deng et al. | ............... | 349/46 |
| 2010/0195009 A1 * | 8/2010 | Ahn et al. | ............... | 349/38 |
| 2010/0230682 A1 * | 9/2010 | Song et al. | ............... | 257/59 |

FOREIGN PATENT DOCUMENTS

CN   1945840 A   4/2007

* cited by examiner

*Primary Examiner* — Laura Menz

(74) *Attorney, Agent, or Firm* — Ladas & Parry LLP

(57) ABSTRACT

An embodiment of the invention provides an array substrate of a thin film transistor liquid crystal display comprising a gate line and a data line formed on a base substrate, a pixel electrode formed in a pixel region defined by intersecting of the gate line and data line, and a thin film transistor (TFT) formed at the intersection as an switch device. The TFT comprises a gate electrode, a gate insulating layer, a transparent conductive layer, a source electrode and a drain electrode, an ohmic contact, a semiconductor layer, and a passivation layer in order from the base substrate. At the drain electrode side the transparent conductive layer is formed by the same layer as the pixel electrode and contacts with the drain electrode, and the source electrode is connected with the data line.

10 Claims, 6 Drawing Sheets

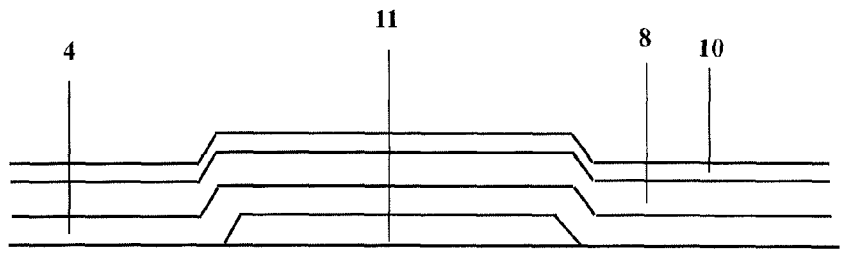

FIG.1b (PRIOR ART)

Step 201 of forming a gate electrode and a gate line on a base substrate by depositing and patterning a gate metal film

Step 202 of forming a gate insulating layer, a semiconductor layer and an ohmic contact on the substrate after step 201 by depositing and patterning a metal film

Step 203 of forming a source electrode and a drain electrode and a data line on the substrate after step 202 by depositing and patterning a source-drain metal film

Step 204 of forming a passivation layer on the substrate after step 203 and forming a via hole therein by patterning

Step 205 of forming a pixel electrode on the substrate after step 204 by depositing and patterning a pixel conductive layer

FIG.2

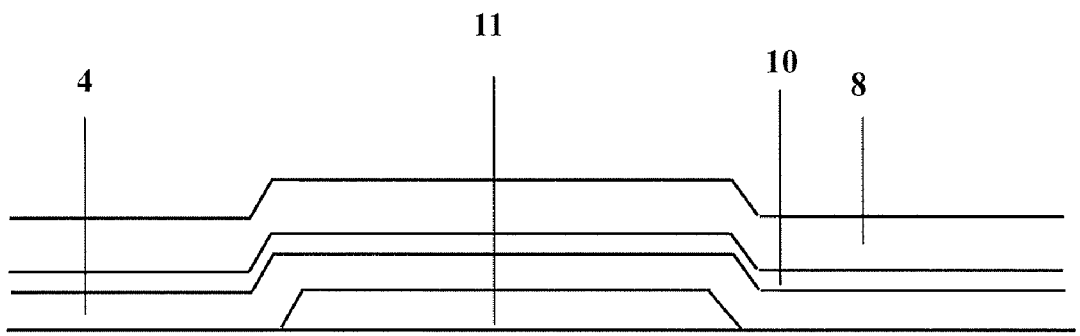

FIG.3b

Step 401 of forming a gate electrode, a gate line, a common electrode line, and a light-blocking strip on a base substrate Step 402a of forming a gate insulating film on the base substrate Step 402b of forming a pixel electrode, a data line, a source electrode and a drain electrode, and an ohmic contact on the gate insulating layer Step 403 of forming a semiconductor layer on the channel region between the source electrode and the drain electrode and on the ohmic contact Step 404 of forming a passivation layer on the semiconductor layer

FIG.4

ARRAY SUBSTRATE OF THIN FILM TRANSISTOR LIQUID CRYSTAL DISPLAY AND METHOD OF MANUFACTURING THE SAME

BACKGROUND

Embodiments of the invention relates to an array substrate of a thin film transistor liquid crystal display (TFT-LCD) and a method of manufacturing the same.

Recently, TFT-LCDs have prevailed in flat panel display market due to the characteristics of excellent display quality, relatively low manufacturing cost, low power consumption, and low radiation, and even the display quality is still gradually improved with the development of technology.

A TFT-LCD has a configuration formed by assembling an array substrate and a color filter substrate. An array substrate of a TFT-LCD typically adopts bottom gate TFTs of back channel etching type as switch devices. As shown in FIGS. 1 and 1a, the array substrate comprises a plurality of gate lines 1, a plurality of data lines 5 perpendicular to the gate lines 1, and pixel regions defined by intersecting of the adjacent gate lines and data lines. Each pixel comprises a TFT as a switch device, a pixel electrode 10, and a common electrode line 11. The TFT comprises a gate electrode 2, a gate insulating layer 4, a semiconductor layer 3, a source electrode 6 and a drain electrode 7, and an ohmic contact 13, which are covered by a passivation layer 8. A via hole 9 is formed over the drain electrode 7 in the passivation layer. The pixel electrode 10 is connected with the drain electrode 7 of the TFT through the via hole 9 in the passivation layer 8. A storage capacitor is formed between the pixel electrode 10 and the gate line 1 together with the common electrode line 11. Light-blocking strips are formed on both sides of the pixel electrode 10 parallel to the data line 5 to reduce light leakage from the pixel after the array substrate and the color filter substrate are assembled together.

A 5-Mask (photolithography) process is conventionally employed to manufacture an array substrate of a TFT-LCD, which comprises the following five steps as shown in FIG. 2.

Step 201 of forming a gate electrode and a gate line on a base substrate by depositing and patterning a gate metal film;

Step 202 of forming a gate insulating layer, a semiconductor layer and an ohmic contact on the substrate after step 201 by depositing and patterning a metal film;

Step 203 of forming a source electrode and a drain electrode and a data line on the substrate after step 202 by depositing and patterning a source-drain metal film;

Step 204 of forming a passivation layer on the substrate after step 203 and forming a via hole therein by patterning; and Step 205 of forming a pixel electrode on the substrate after step 204 by depositing and patterning a pixel conductive layer.

The above-mentioned process is a typical 5-Mask process, each step of which comprises depositing a film, forming a photoresist pattern by coating, exposing, and developing a photoresist layer on the film, etching the film with the photoresist mask, and so on.

In the above method and the array substrate thus manufactured, since a storage capacitor is formed between the pixel electrode 10 and the gate line 1 together with the common electrode line 11, as shown in FIG. 1b, a two layer structure including the gate insulating layer 4 and the passivation layer 8 is formed between the pixel electrode 10 and the gate line 1 (not shown in FIG. 1b) together with the common electrode line 11 so that the distance between the pixel electrode 10 and the gate line 1 and the distance between the pixel electrode 10 and the common electrode 11 become relatively large. Therefore, the storage capacitance become relatively small, and the switching voltage become relatively high, which adversely affects the display quality of the finished display device. In addition, since exposure process is performed five times in the 5-Mask process, the manufacturing period is relatively long, reducing productivity and increasing manufacturing cost.

SUMMARY

An embodiment of the invention provides an array substrate of a thin film transistor liquid crystal display comprising a gate line and a data line formed on a base substrate, a pixel electrode formed in a pixel region defined by intersecting of the gate line and data line, and a thin film transistor (TFT) formed at the intersection as an switch device. The TFT comprises a gate electrode, a gate insulating layer, a transparent conductive layer, a source electrode and a drain electrode, an ohmic contact, a semiconductor layer, and a passivation layer in order from the base substrate. At the drain electrode side the transparent conductive layer is formed by the same layer as the pixel electrode and contacts with the drain electrode, and the source electrode is connected with the data line.

Another embodiment of the invention provides a method of manufacturing an array substrate of a thin film transistor liquid crystal display, comprising the steps of:

forming a gate electrode and a gate line on a base substrate;

forming a gate insulating layer on the gate electrode and the gate line;

forming a pixel electrode, a data line, a source electrode and a drain electrode, and an ohmic contact on the gate insulating layer by successively depositing a transparent conductive layer, a source-drain metal layer, and an ohmic contact layer and then patterning the stack of the layers;

forming a semiconductor layer on a channel region between the source and drain electrodes and on the ohmic contact; and forming a passivation layer on the semiconductor layer.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The invention will become more fully understood from the detailed description given hereinafter and the accompanying drawings which are given by way of illustration only, and thus are not limitative of the invention and wherein:

FIG. 1b is a cross sectional view showing a storage capacitor taken along line B-B of FIG. 1;

FIG. 2 is a flow chart showing a method of manufacturing a conventional TFT-LCD array substrate;

FIG. 3b is a cross sectional view showing a storage capacitor taken along line D-D of FIG. 3;

FIG. 4 is a flow chart showing a method of manufacturing a TFT-LCD array substrate according to an embodiment of the invention;

DETAILED DESCRIPTION OF THE PREFERRED EMBODIMENTS

Embodiments of the invention will be described in detail hereinafter with reference to the accompanying drawings.

Figure 1:
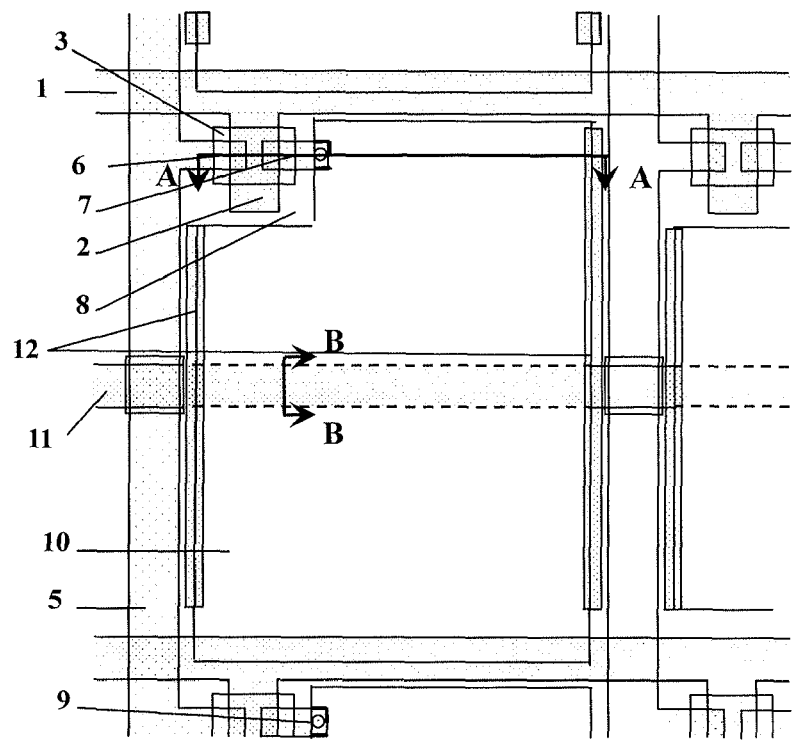
FIG. 1 is a top view showing one pixel of a conventional TFT-LCD array substrate.
Figure 1A:
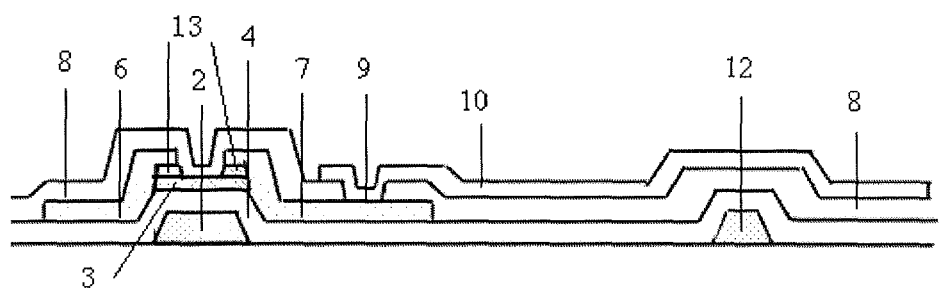
FIG. 1a is a cross sectional view taken along line A-A of FIG. 1.
Figure 3:
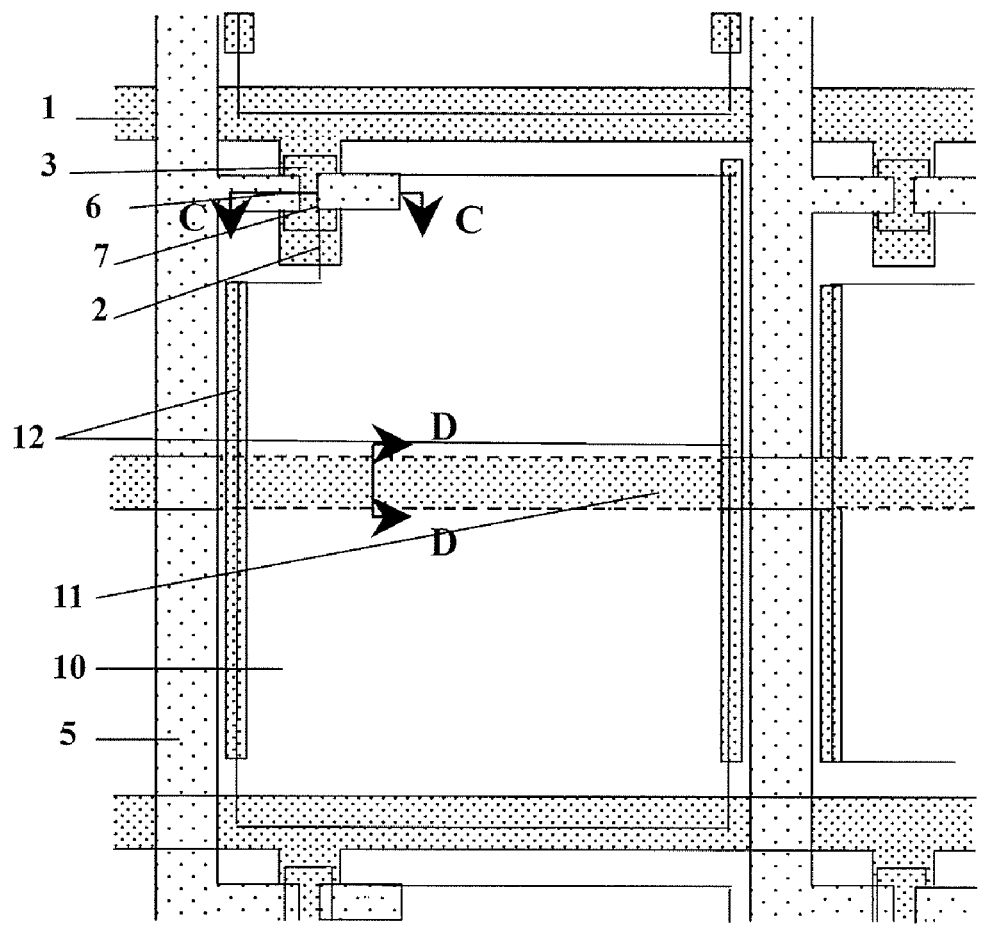
FIG. 3 is a top view showing one pixel of a TFT-LCD array substrate according to an embodiment of the invention.
Figure 3A:
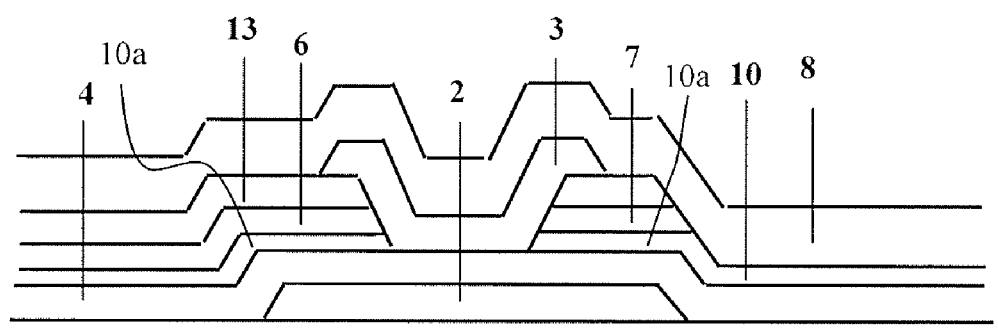
FIG. 3a is a cross sectional view taken along line C-C of FIG. 3.

An embodiment of the invention provides an array substrate. As shown in FIGS. 3 and 3a, the structure of the array substrate according to the present embodiment comprises a gate line 1 and a data line 5 formed on a base substrate 20, a pixel electrode 10 formed within a pixel region defined by intersecting of the gate line 1 and data line 5, and a thin film transistor (TFT) formed at the intersection. The TFT comprises a gate electrode 2, a gate insulating layer 4, a transparent conductive layer 10a, a source electrode 6, a drain electrode 7, an ohmic contact 13, a semiconductor layer 3 and a passivation layer 8 in order from the base substrate 20. The structure of the array substrate will be described in detail as follows. The pixel electrode 10 and the transparent conductive layer 10a are formed by the same one transparent conductive film and are integral.

On the base substrate 20, the gate line and gate electrode 2 is formed. The gate electrode 2 and the gate line 1 are formed in the same process and may be perpendicular to each other, but the invention is not limited to this case, and in another embodiment the gate electrode is a portion of the gate line 1. The gate insulating layer 4 is formed on the gate electrode 2 and the gate line 1. The source electrode 6 and the drain electrode 7 are formed over the gate electrode 2 and overlap with the gate electrode via the gate insulating layer 4 and the transparent conductive layer 10a. The transparent conductive layer 10a connects the drain electrode 7 with the pixel electrode 10 at the drain electrode side. The data line 5 is connected with the source electrode 6 and extends perpendicularly to the gate line 1. Since the transparent conductive layer 10a and the pixel layer 10 are formed with the same layer, the source electrode 6 and the drain electrode 7 are also formed over the pixel electrode 10. The ohmic contact 13 is formed on the data line 5, the source electrode 6 and the drain electrode 7.

A light-blocking strip is formed within the pixel region at the position adjacent to the data line 5 and parallel to the date line 5, preventing light leakage from the pixel after the array substrate and a color filter substrate are assembled together to obtain a display device.

The semiconductor layer 3 is formed on the channel region between the source electrode 6 and the drain electrode 7 and on the ohmic contact 13. Since the semiconductor layer 3 is sheltered by the underlying metal wiring, the light from a backlight of the display device cannot be incident on the semiconductor layer, avoiding the occurring of optoelectric effect of the semiconductor layer 3.

The passivation layer 8 is formed on the semiconductor layer 3 as an uppermost layer. In the embodiment, the transparent conductive layer contacts the drain electrode, thus the pixel electrode 10 is connected with the drain electrode 7 directly rather than through a via hole in the passivation layer 8. Therefore, the process of forming a via hole can be reduced. In a conventional array substrate, the via hole formed to connect the pixel electrode and the drain electrode blocks light passing array substrate, but in the embodiment, since such a via hole is not needed any more, the aperture ratio of the pixel region can be increased, and furthermore the contact area between the pixel electrode 10 and drain electrode 7 can be increased and results in better contact effect.

Also as shown in FIG. 3b, the array substrate may further comprises a common electrode line 11, which is formed in the same level as the gate line 1 and parallel to the gate line 1. Since only the gate insulating layer 4 is formed between the pixel electrode 10 and the common electrode line 11, the distance between the pixel electrode 10 and the common electrode line 11 can be reduced relatively and the storage capacitance between them can be increased accordingly. Also, the distance between the pixel electrode 10 and the gate line 1 can be reduced relatively and the storage capacitance between them can be increased accordingly.

The gate line 1, the gate electrode 2, the data line 5, the source electrode 6 and the drain electrode 7 of the TFT, the common electrode line 11 and the light-blocking strip 12 can be formed by any one material of aluminum, chromium, tungsten, tantalum, titanium, molybdenum, and aluminum-nickel in a single-layer structure or a composite layer structure. The gate line 1, the gate electrode 2, the common electrode line 11 and the light-blocking strip 12 can be formed in the same patterning process by using the same material. The gate insulating layer 4 can be formed by silicon nitride, silicon dioxide or aluminum oxide. The pixel electrode 10 is formed by indium tin oxide, indium zinc oxide or aluminum zinc oxide.

Corresponding to the array substrate of thin film transistor liquid crystal display, a method of manufacturing an array substrate of a TFT-LCD is also provided in an embodiment of the invention. As shown in FIG. 4, the method of the embodiment comprises the following steps.

Step 401 of forming a gate electrode 2, a gate line 1, a common electrode line 11, and a light-blocking strip 12 on a base substrate.

In the step, a gate metal film with the film thickness of about 1000 Å to 7000 Å is deposited on the base substrate, for example, by magnetron sputtering method. The gate metal film can be formed of any one of molybdenum, aluminum, aluminum-nickel, molybdenum-tungsten, chromium, and copper, or any combination of the aforesaid materials. Next, the gate electrode 2, the gate line 1, the common electrode line 11, and the light-blocking strip 12 are formed on the base substrate by a patterning process.

Step 402a of forming a gate insulating film 4 on the base substrate.

The gate insulating film 4 with the film thickness of about 1000 Å to 6000 Å is deposited on the array substrate after step 401, for example, by a chemical vapor deposition (CVD) method. The gate insulating film can be formed of silicon nitride, silicon oxide, or silicon oxynitride.

Step 402b of forming a pixel electrode 10, a data line 5, a source electrode 6 and a drain electrode 7, and an ohmic contact 13 on the gate insulating layer.

A transparent conductive layer with the film thickness of about 100 Å to 1000 Å is deposited on the base substrate after the step 402a with ITO (Indium Tin Oxide) or IZO (Indium Zinc Oxide) by a deposition method. A source-drain metal thin film with the film thickness of about 1000 Å to 7000 Å, the material of which may be similar to that of the gate line, is deposited on the pixel electrode layer. The ohmic contact layer with the film thickness of about 1000 Å to 6000 Å is then deposited on the metal thin film and may be formed of n+a-Si:H, that is, n-type doped amorphous silicon.

Figure 5:
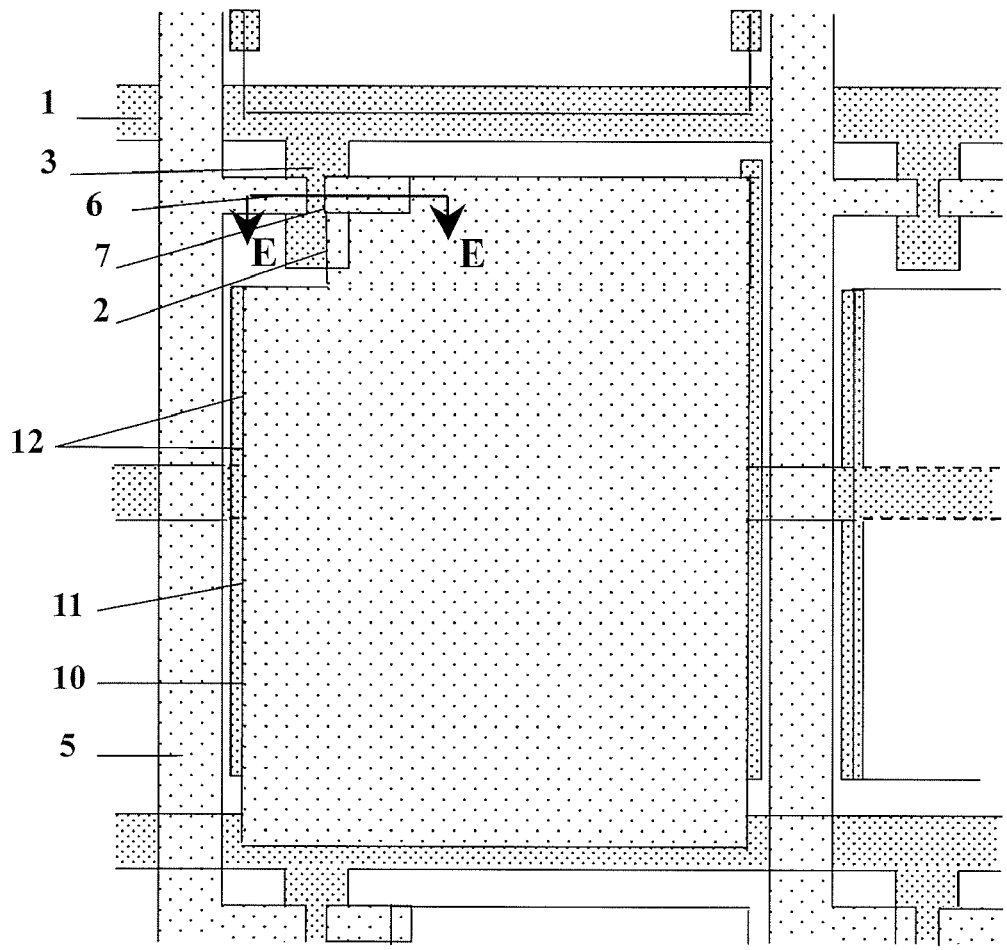
FIG. 5 is top view showing one pixel after a first etching for a data line, a source electrode and a drain electrode and an ohmic contact is performed.
Figure 6:
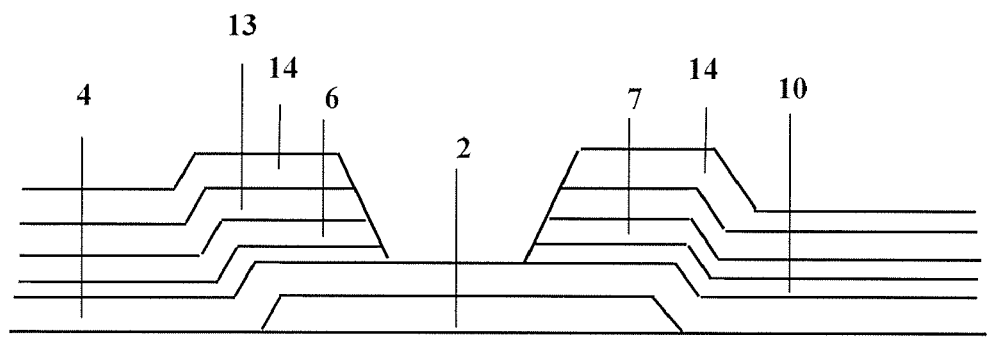
FIG. 6 is a cross sectional view taken along line E-E of FIG. 5.

Then the patterning process on the stack of the above layers is performed with a half-tone (or a gray-tone) process. A photoresist layer 14 is coated and exposed with a half-tone mask (or a gray-tone mask) to obtain unexposed region, half exposed region, and exposed region. The region where the data line, the source electrode, the drain electrode, and the ohmic contact are formed is the unexposed region and, after development, is covered by the photoresist layer of full thickness; the region where the pixel electrode is formed is the half exposed region and, after development, is covered by the photoresist layer of partial thickness; the remaining region is exposed region and, after development, is free of the photoresist layer and exposed. The exposed stack of ohmic contact layer, the metal thin film and the transparent conductive layer in the exposed region is removed by a physical or chemical etching method in a first etching process. One pixel after the first etching for the data line, the source electrode, the drain electrode and the ohmic contact layer is performed in the embodiment is shown in FIG. 5. FIG. 6 is a cross sectional view taken along line E-E of FIG. 5.

Figure 6A:
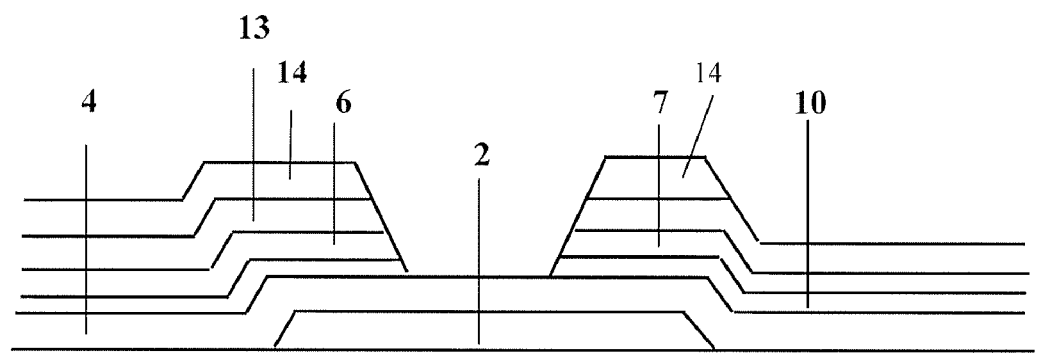
FIG. 6a is a cross sectional view taken along line E-E of FIG. 5 after the partial thickness photoresist layer is ashed.
Figure 6B:
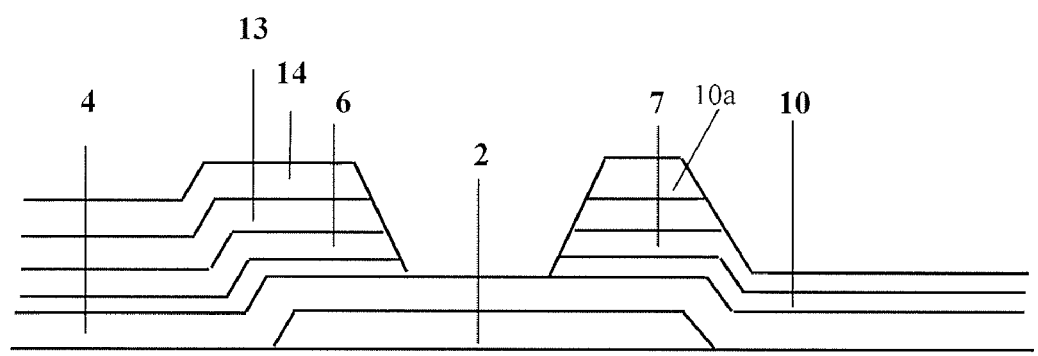
FIG. 6b is a cross sectional view taken along line E-E of FIG. 5 after the ohmic contact layer is etched.
Figure 6C:
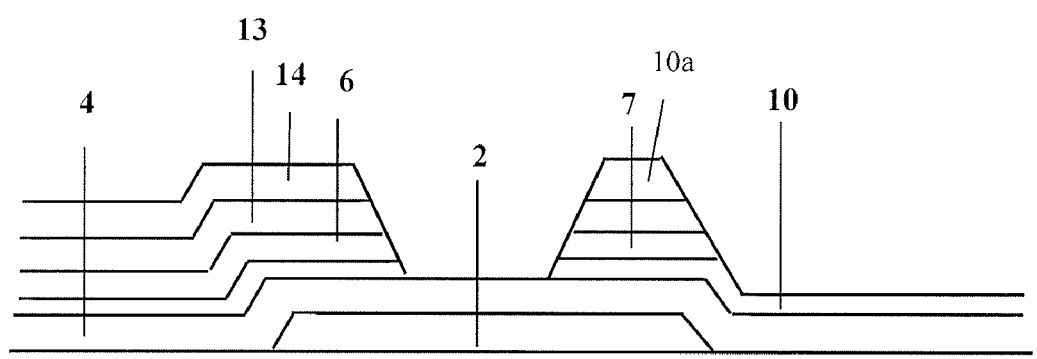
FIG. 6c is a cross sectional view taken along line E-E of FIG. 5 after the source-drain metal layer is etched.

Next, the photoresist layer of partial thickness in the half exposed region is removed by an ashing treatment, and the underlying ohmic contact layer is exposed in the half exposed region after the treatment. In the half exposed region, the ohmic contact layer and the metal thin film are successively removed by a physical or chemical etching method so as to form the data line 5, the source electrode 6 and the drain electrode 7 and expose the pixel electrode 10. The portion of the transparent conductive layer that is exposed forms the pixel electrode and contacts with the drain electrode 7 through the portion that is overlapped with drain electrode 7. By the above steps, the drain electrode 7 is directly connected with the pixel electrode 10 with a relative large area. The structure after each of the etching processes are shown in the cross-sectional views of FIGS. 6a, 6b, and 6c taken along line E-E of FIG. 5.

Step 403 of forming a semiconductor layer 3 on the channel region between the source electrode 6 and the drain electrode 7 and on the ohmic contact 13.

On the base substrate after step 402b, an amorphous silicon layer is deposited on the ohmic contact 13 as the semiconductor layer 3. Then, the semiconductor layer 3 is formed at the channel portion of the TFT and on the ohmic contact 13 by patterning the amorphous silicon layer. Thus formed semiconductor layer 3 can be sheltered by the underlying metal wiring, the light from the backlight cannot be incident on the semiconductor layer 3, thus occurring of optoelectric effect to the semiconductor is prevented.

Step 404 of forming a passivation layer 8 on the semiconductor layer.

On the substrate after step 403, the passivation layer is deposited on the semiconductor layer and also on the exposed pixel electrode 10 by a deposition method. Then the passivation layer 8 has the thickness of about 1000 Å to 6000 Å.

In the present embodiment, based on the structural change of the array substrate of a TFT-LCD, no exposure process is needed when the gate insulating layer is formed in step 402a, thus steps 402a and 402b can be combined into one step. In addition, when the pixel electrode, the data line, the source electrode and the drain electrode, and the ohmic contact are formed in the step 402b, a half-tone process (or a gray-tone process) is adopted; therefore, one exposure process can be reduced and a 4-Mask process can be used to manufacture the array substrate of a TFT-LCD. The manufacturing period can be reduced and productivity can be improved. Furthermore, the storage capacitance can be increased because the distance between pixel electrode and the gate line and/or common electrode line can be reduced.

The invention has been described with reference to the above embodiments; however, it can be realized by adding or reducing exposure process and using other materials and material combinations than the mentioned examples. In addition, various modifications and variations can also be made to the structure of the TFT that is used as a switch device.

The embodiment of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. An array substrate of a thin film transistor liquid crystal display comprising a gate line and a data line formed on a base substrate, a pixel electrode formed in a pixel region defined by intersecting of the gate line and data line, and a thin film transistor (TFT) formed at the intersection as an switch device, wherein:

the TFT comprises a laminated sequence of a gate electrode, a gate insulating layer, a transparent conductive layer, a source electrode and a drain electrode, an ohmic contact, a semiconductor layer, and a passivation layer in order from the base substrate; and at the drain electrode side the transparent conductive layer is formed by the same layer as the pixel electrode and contacts with the drain electrode, and the source electrode is connected with the data line.

2. The array substrate according to claim 1, further comprising:

a common electrode line that is formed at the same level as the gate electrode and the gate line and extending parallel to the gate line.

3. The array substrate according to claim 2, further comprising:

a light-blocking strip that is formed within the pixel region on the base substrate and is parallel to the data line.

4. The array substrate according to claim 3, wherein the data line is formed above the pixel electrode.

5. The array substrate according to claim 2, wherein a storage capacitor is formed between the pixel electrode and the common electrode line.

6. The array substrate according to claim 1, wherein the gate line, the gate electrode, the data line, the source electrode and the drain electrode of the TFT, the common electrode line and the light-blocking strip are a single layer formed by any one material selected from the group consisting of aluminum, chromium, tungsten, tantalum, titanium, molybdenum, and aluminum-nickel.

7. The array substrate according to claim 1, wherein the gate line, the gate electrode, the data line, the source electrode and the drain electrode of the TFT, the common electrode line and the light-blocking strip are a composite layer formed by any combination of the materials selected from the group consisting of aluminum, chromium, tungsten, tantalum, titanium, molybdenum, and aluminum-nickel.

8. The array substrate according to claim 3, wherein the gate line, the gate electrode, the common electrode line, and the light-blocking strip are formed in a same patterning process by a same layer.

9. The array substrate according claim 1, wherein the gate insulating layer is formed by a material selected from the group consisting of silicon nitride, silicon dioxide and aluminum oxide.

10. The array substrate according to claim 1, wherein the pixel electrode and the transparent conductive layer are formed by a material selected from the group consisting of indium tin oxide, indium zinc oxide and aluminum zinc oxide.

* * * * *